(12) United States Patent
Leung et al.

(10) Patent No.: US 7,886,292 B2
(45) Date of Patent: Feb. 8, 2011

(54) METHODOLOGY OF INDIVIDUALIZED SOFTWARE DEPLOYMENT FOR HARDWARE-INDEPENDENT PERSONAL COMPUTER MASS DEVELOPMENT

(75) Inventors: Tong Kien Leung, Singapore (SG); Aik Beng Ng, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 1161 days.

(21) Appl. No.: 11/538,930

(22) Filed: Oct. 5, 2006

(65) Prior Publication Data

US 2008/0098386 A1 Apr. 24, 2008

(51) Int. Cl.
G06F 9/445 (2006.01)
G06F 9/44 (2006.01)
(52) U.S. Cl. ............................. 717/174; 717/168
(58) Field of Classification Search ............... 717/174, 717/168
See application file for complete search history.

(56) References Cited

U.S. PATENT DOCUMENTS

| | | | | |
|---|---|---|---|---|
| 5,742,829 | A * | 4/1998 | Davis et al. | 717/178 |
| 5,867,713 | A * | 2/1999 | Shrader et al. | 717/176 |
| 6,266,811 | B1 * | 7/2001 | Nabahi | 717/174 |
| 6,385,766 | B1 * | 5/2002 | Doran et al. | 717/174 |
| 6,681,391 | B1 * | 1/2004 | Marino et al. | 717/175 |
| 6,944,653 | B2 * | 9/2005 | Fong et al. | 709/220 |
| 7,356,679 | B1 * | 4/2008 | Le et al. | 713/1 |
| 7,360,211 | B2 * | 4/2008 | Hyden et al. | 717/174 |
| 7,496,911 | B2 * | 2/2009 | Rowley et al. | 717/174 |
| 2003/0028869 | A1 * | 2/2003 | Drake et al. | 717/177 |
| 2003/0041236 | A1 | 2/2003 | Nestoryak | |
| 2003/0126242 | A1 * | 7/2003 | Chang | 709/222 |
| 2004/0083355 | A1 | 4/2004 | Smith et al. | |
| 2004/0205748 | A1 | 10/2004 | Iyer | |
| 2004/0221146 | A1 | 11/2004 | Baumann | |
| 2005/0027831 | A1 | 2/2005 | Anderson et al. | |
| 2005/0055692 | A1 | 3/2005 | Lupini et al. | |
| 2005/0086457 | A1 | 4/2005 | Hohman | |
| 2005/0091348 | A1 * | 4/2005 | Ferri et al. | 709/220 |
| 2005/0132349 | A1 * | 6/2005 | Roberts et al. | 717/168 |
| 2005/0182921 | A1 | 8/2005 | Duncan | |
| 2005/0198628 | A1 * | 9/2005 | Graham et al. | 717/174 |
| 2006/0217111 | A1 * | 9/2006 | Marolia et al. | 455/418 |
| 2006/0277542 | A1 * | 12/2006 | Wipfel | 717/174 |
| 2007/0240154 | A1 * | 10/2007 | Gerzymisch et al. | 717/174 |
| 2007/0271437 | A1 * | 11/2007 | Ramirez et al. | 711/173 |

OTHER PUBLICATIONS

"Dell Manuals, Using Update Packages, Dell™ Update Packages for Red Hat® Linux User's Guide", Nov. 19, 2004, pp. 1-5. http://web.archive.org/web/20100919021753/http://support.dell.com/support/edocs/software/smdup/dup14/en/uglinhtm/2using.htm?~f=.*

* cited by examiner

Primary Examiner—Wei Y Zhen
Assistant Examiner—Chih-Ching Chow
(74) Attorney, Agent, or Firm—Yee & Associates, P.C.; Steven L. Bennett

(57) ABSTRACT

A computer implemented method, system, and computer usable program code are provided for individualized software deployment. A solution engine receives a set of software applications and a software legend from a customer. The software legend identifies which software applications are to be deployed to each of a set of personal computers. The solution engine forms a set of software images by associating the software applications to each of the set of personal computers. Then the solution engine associates an identifier to each of the set of software images to form individualized software images. The set of software images are deployed to the set of personal computers on an individual requirement basis.

12 Claims, 3 Drawing Sheets

METHODOLOGY OF INDIVIDUALIZED SOFTWARE DEPLOYMENT FOR HARDWARE-INDEPENDENT PERSONAL COMPUTER MASS DEVELOPMENT

BACKGROUND OF THE INVENTION

1. Field of the Invention

The present invention relates generally to personal computer configuration. More specifically, the present invention is directed to a computer implemented method, data processing system, and computer usable program code for individualized software deployment for hardware-independent personal computer mass deployment.

2. Description of the Related Art

In mass software deployment projects, customers commonly have the numerous concerns, such as:

The customer owns different brands and/or models of personal computers, which gives rise to many hardware-specific images.

The customer has a huge software repertoire and image library that is usually poorly managed.

The customer requires that the suite of software to be installed is unique and tailored to individual personal computer users.

The customer expressed the needs to control the number of images created in light of upcoming personal computer hardware models and brands.

Associated challenges that may arise out of the above requirements:

Number of images grows larger with every purchase of a new personal computer brand and/or model. As a result, images soon become obsolete and a significant amount of skilled labor and cost can be incurred to create & maintain the images.

Image library becomes too big and unmanageable as the personal brands and models become increasingly diversified, this gives rise to great difficulty in information technology maintenance support.

To satisfy the need for individualized suite of software for each personal computer user, a sizeable information technology support team is required to keep track of the user vs. software matrix and perform the actual software installations. Keeping track of the information is widely recognized as a time-consuming, labor intensive, and an expensive approach which is subjected to reliability and consistency issues.

Thus, the growth innovative metrics (GIM) becomes undesirable due to a high ratio of headcount vs. revenue. Current solutions in personal computer mass deployment, such as ImageUltra™ Builder (IUB) from International Business Machines, Inc., and Ghost™ and PowerQuest™ from Symantec™ Corporation, are used extensively to deploy software images and/or software. However, there are limitations to the current solutions, such as high running cost, limited capabilities, and compromises.

In the ImageUltra™ Builder the process starts by booting the target computer with an ImageUltra™ Builder deployment compact disc or ImageUltra™ Builder deployment diskette and selecting the required maps from the repository. The selected maps, and modules defined within the maps, are obtained from a repository and copied over a network to a service partition. An installation phase is started by making selections from installation menus to define the image to be installed. The modules required for the defined image are unpacked from the service partition onto a C partition. Finally, the setup process begins and, once completed, the C partition contains the new image and the service partition contains a smart image, which can be used for client side recovery.

Thus, current solutions are time-consuming, labor intensive, and expensive.

BRIEF SUMMARY OF THE INVENTION

The different aspects of the illustrative embodiments provide a computer implemented method, system, and computer usable program code for individualized software deployment. The illustrative embodiments receive a set of software applications and a software legend. The software legend identifies a number of the set of software applications to each of a set of personal computers. The illustrative embodiments associate the number of the set of software applications to each of the set of personal computers to form a set of software images. The illustrative embodiments associate an identifier to each of the set of software images to form individualized software images. The set of software images are deployed to the set of personal computers on an individual requirement basis.

BRIEF DESCRIPTION OF THE SEVERAL VIEWS OF THE DRAWINGS

The novel features believed characteristic of the illustrative embodiment are set forth in the appended claims. The different aspects of the illustrative embodiments, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
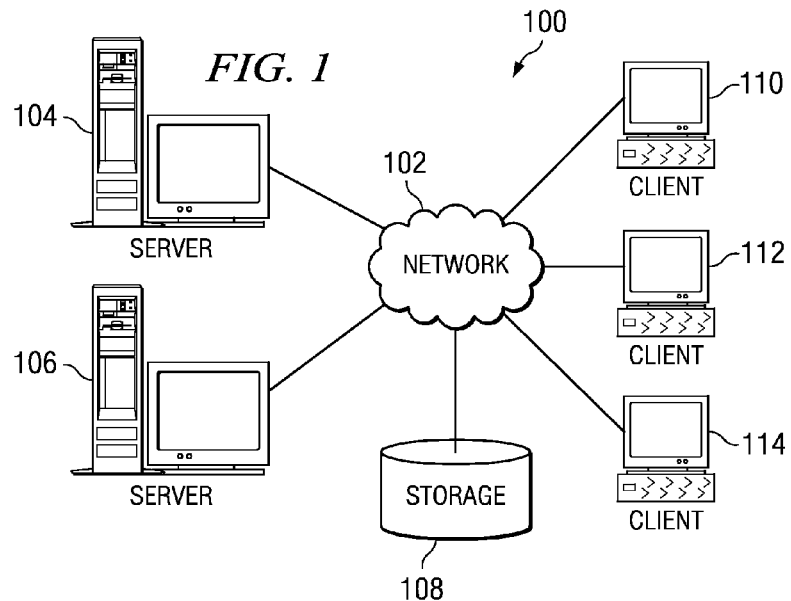
FIG. 1 depicts a pictorial representation of a network of data processing systems in which illustrative embodiments may be implemented.
Figure 2:
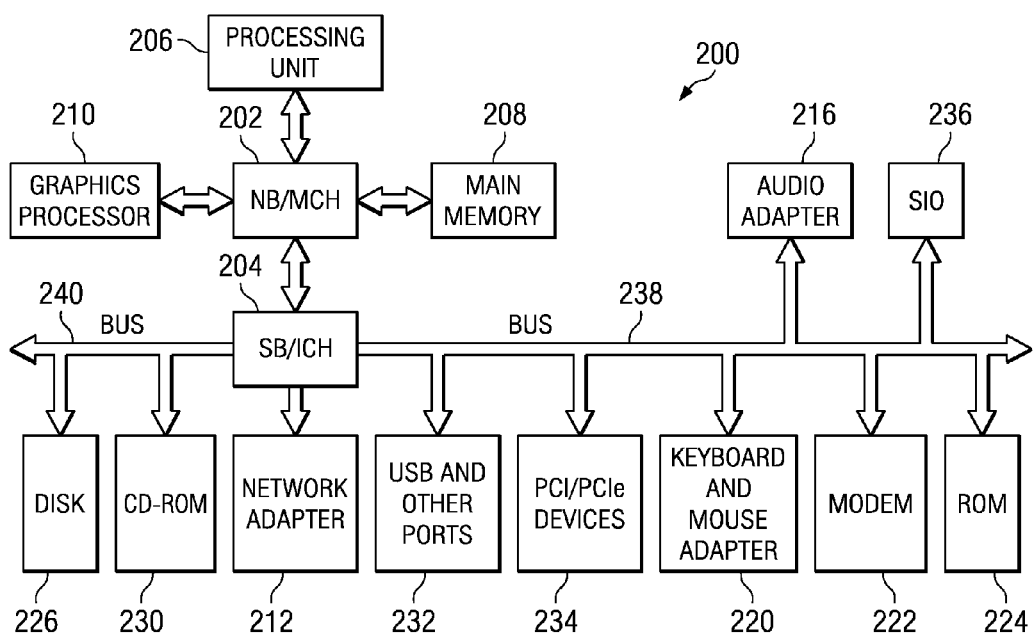
FIG. 2 depicts a block diagram of a data processing system is shown in which illustrative embodiments may be implemented.

The illustrative embodiments provide for a computer implemented method, data processing system, and computer usable program code for individualized software deployment for hardware-independent personal computer mass deployment. With reference now to the FIGS. and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the FIGS., FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments provides a computer implemented method, apparatus, and computer usable program code to transform traditional manual process for software deployment into a decentralized and highly automated process that reduces duplication of work effort spent in identifying and allocating individual software packages to individual users. The illustrative embodiments receive a set of software applications and a software legend. The software legend identifies a number of the set of software applications to each of a set of personal computers. The illustrative embodiments associate the number of the set of software applications to each of the set of personal computers to form a set of software images. The illustrative embodiments associate an identifier to each of the set of software images to form individualized software images. The set of software images are deployed to the set of personal computers on an individual requirement basis. For example, a typical personal computer deployment involving software installations for individual users would require extensive administrative work in identifying "who-gets-what" and then ensuring that this message is properly conveyed to the field deployment team members who will then execute the "who-gets-what". This process is both time intensive and prone to human error due to multiple stages of communication.

The illustrative embodiments provide a highly adaptable, easily implemented and upgradeable process using various mainstream technologies as time progresses without the need to invest in the development of a proprietary technology which can be outdated easily. For example, the web application portion in the illustrative embodiments may be easily adapted and implemented general-purpose scripting languages, such as PHP: Hypertext Preprocessor (PHP), ASP-.net, or JavaServer Pages™ (JSP).

Additionally, the illustrative embodiments are highly resilient and adaptive to changes in technologies, as the illustrative embodiments rely on basic principles in technologies which have existed over multiple evolutionary cycles. For example, the Microsoft® DOS scripting language has been around for years and, similarly, UNIX® Shell scripting language has been around for years. As such, scripting proves to be an integral and essential part of operating systems.

Figure 3:
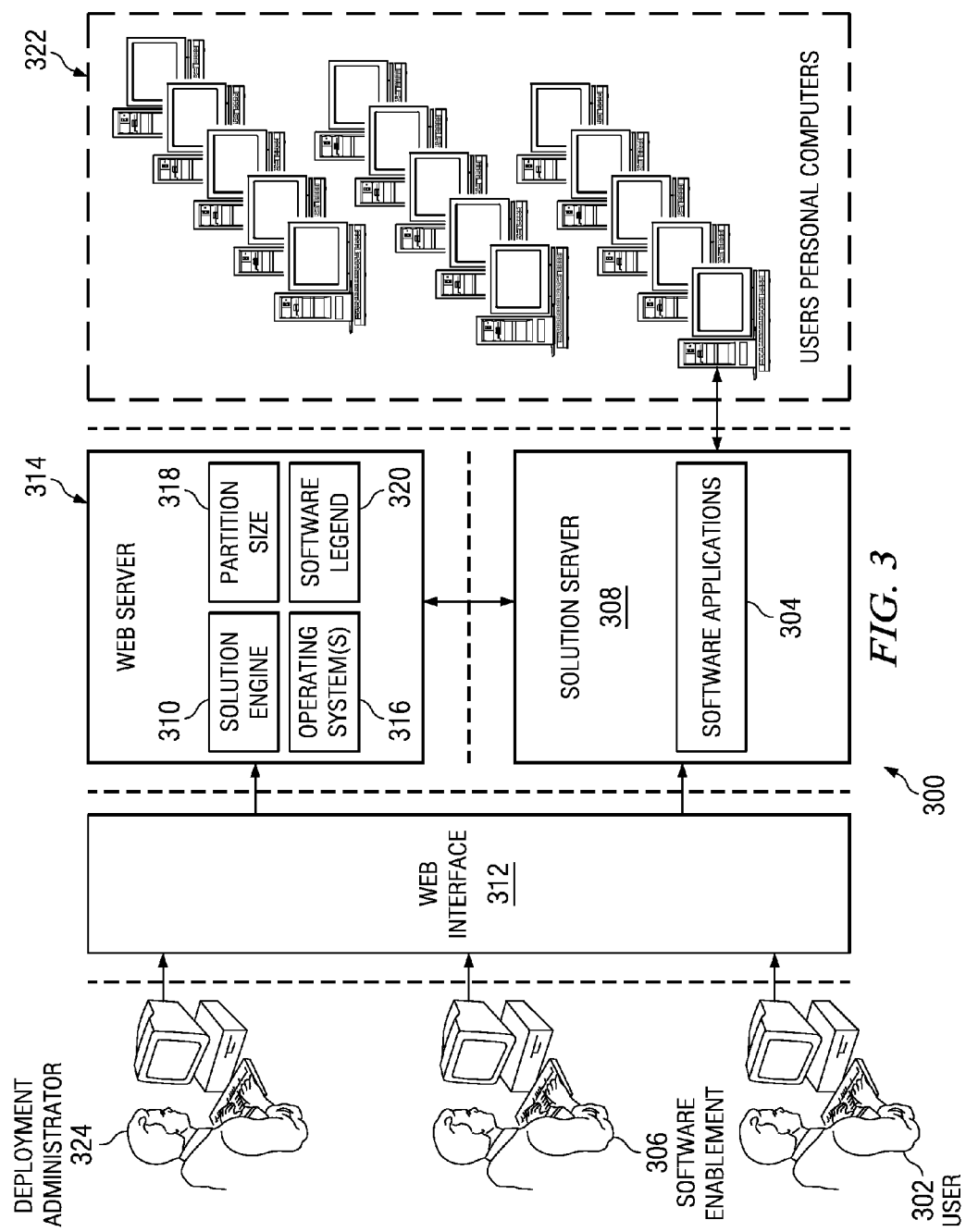
FIG. 3 illustrates a functional block diagram of the components used to implement a hardware-independent personal computer mass software deployment system in accordance with an illustrative embodiment.

FIG. 3 illustrates a functional block diagram of the components used to implement a hardware-independent personal computer mass software deployment system in accordance with an illustrative embodiment. In mass software deployment system 300, user 302 provides all software applications 304 intended to be deployed within user's 302 organization to software enablement administrator 306 for upload into solution server 308. Software enablement administrator 306 instructs solution engine 310 on the location of software applications 304 through web interface 312. Notifying solution engine 310 of the location of software applications 304 improves over conventional methods, in that, the Information Technology team does not need to inform the Operations team on where software applications 304 are uploaded to.

Hence, the illustrative embodiments reduce the risk of miscommunications and solution engine 310 is able to locate software applications 304 instead of relying on human efforts which are subjected to high error rate as the number of staff increases. Solution server 308 may be a server, such as server 104 or 106 of FIG. 1. User 302 may also optionally indicate operating system(s) information 316 to be used and provides a license key for each operating system. User 302 may also optionally provide hard disk partition sizes 318 for each respective personal computer machine model that user 302 is currently using or plans to deploy. Finally, user 302 provides software legend 320 detailing every user in user's 302 organization and the user's software needs. Software applications 304, operating system information 316, hard disk partition sizes 318, and software legend 320 may be stored on a storage unit such as storage unit 108 of FIG. 1.

Web interface 312 which is a user interface to software deployment system 300 may provide audits of the information provided by user 302 to ensure that the information provided by user 302 is valid and that user 302 has loaded all required information. Once user 302 has loaded all of the required information into Web server 314 and solution server 308, software enablement administrator 306 and/or deployment admin 324 load all user's 302 inputs into solution engine 310 running on Web server 314. Web server 314 may be a server, such as server 104 or 106 of FIG. 1. Solution engine 310 may be an application that is executed by the processor of Web server 314, such as processor 206 of FIG. 2. The execution of solution engine 310 will be described further in FIG. 4. Solution engine 310 provides a deployment solution that associates a user identifier to each user specified in software legend 320. The specific operation of solution engine 310 will be described further in FIG. 4.

For each user identifier, solution engine 310 specifies a user's solution package, which is also used in the generation of the logic script, flat file, or other type of configuration file which will reside in solution server 308. Each solution package identifies the corresponding operating system 316 running on each of users personal computers 322, partition size 318 required for each of users personal computers 322, and software applications 304 that are to be deployed on each of users personal computers 322. The solution package is a collection of data, such as software legend 320, operating system 316, and partition size 318, stored in a solution database, such as MySQL® database. The stored information will then be used by solution engine 310 to generate the appropriate logic script corresponding to the operating system type. Upon activation of the logic file, the logic script identifies one of users personal computers 322 based on the user identifier and proceeds to install the software accordingly. When user 302 requests a specific users personal computer 322 be deployed, deployment administrator 324 only needs to recall the associated user identifier and solution engine 310 will deploy the appropriate user solution package.

Figure 4:
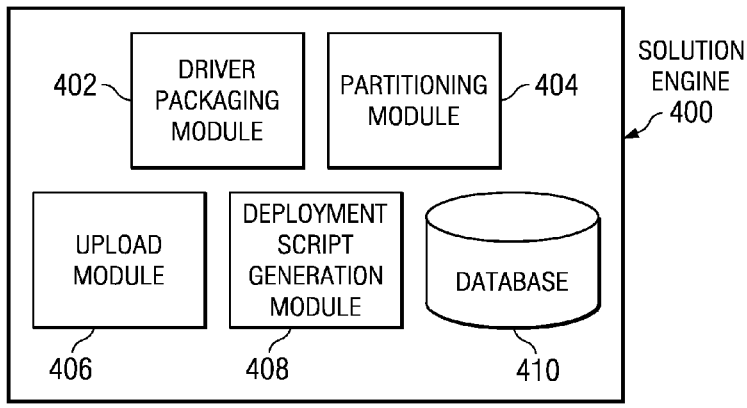
FIG. 4 depicts a functional block diagram for a solution engine in accordance with an illustrative embodiment.

FIG. 4 depicts a functional block diagram for a solution engine in accordance with an illustrative embodiment. Solution engine 400 may be a solution engine, such as solution engine 310 of FIG. 3. Solution engine 400 may be composed of one or more of driver packaging module 402, partitioning module 404, upload module 406, deployment script generation module 408, or database 410. To achieve a solution package for each user, or a user image, specified by the customer, solution engine 400 takes into consideration that loading of a driver package may be dynamic and independent from the user's individualized software image, the partitioning of the hard disk may be dynamic and independent from the hard disk size, and the loading of software packages must be dynamic and independent from the user image. A driver package may be a group of drivers that are associated with and required to run the software applications. Alternatively, the image loading script may be instructed to search for the driver packages in a network drive which may be constantly updated independent of the user image.

Driver packaging module 402 may be created with a scripting language used in the operating system task automation, such as batch programming, VBScript™, or AutoIT®. Driver packaging module 402 may be used to direct the operating system to search for drivers in a specified drive. For example in Windows® XP, driver packaging module 402 may change the registry's default driver detection path to point to the specified drive which contains all the drivers. Driver packaging module 402 may also automatically install the necessary drivers from a network drive. Driver packaging module 402 could be loaded into solution engine 400 by the deployment administrator to pre-determine what drivers the user should obtain, and, in a similar fashion, how the user is assigned his/her software packages.

Partitioning module 404 may be a disk utility that may be included in addition to an image tool so that the image can be resized accordingly to the desired partitioning needs at the point of image loading. For example, the gdisk tool from Symantec™ Corporation can be used to resize partitions. By using a batch script, the gdisk tool can be called to resize the partitions of the image being loaded. In addition, the batch scripts can be dynamically created by deployment script generation module 408 based on the data input by the deployment administrator. Upload module 406 uses the software legend, such as software legend 320 of FIG. 3, to configure the needs of each user's personal computer. Using the software legend, upload module 406 loads the necessary information into database 410. Then solution engine 400 is able to read the necessary information from database 410 and dynamically generate a logic script by plugging in all the information into a base logic script template. Base logic script templates may vary depending on which operating system the software is being deployed to. After the generation of the logic script, solution engine 400 stores the logic script in database 410.

Figure 5:
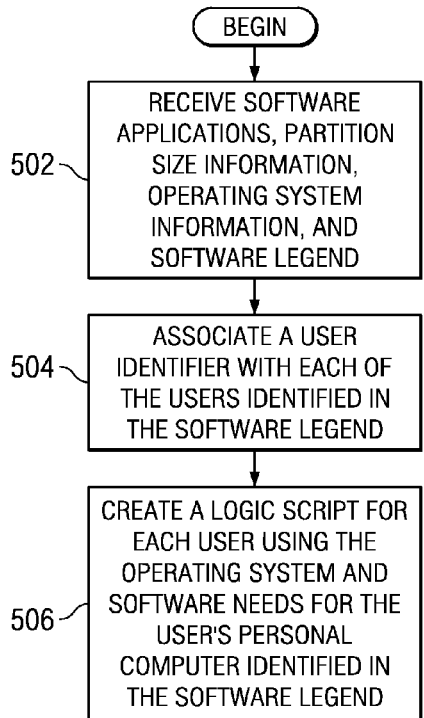
FIG. 5 illustrates a flowchart of the initial configuration operation performed by a solution engine in accordance with an illustrative embodiment.

FIG. 5 illustrates a flowchart of the initial configuration operation performed by a solution engine, such as solution engine 400 of FIG. 4, in accordance with an illustrative embodiment. As the operation begins, the upload module, such as upload module 406 of FIG. 4, within the solution engine receives the customer's software applications, partition size information, operating system information, and software legend from a Web server and stores the information in a database, such as database 410 of FIG. 4 (step 502). A software enablement administrator or deployment administrator transfers this information to the solution engine when the customer has indicated that all of the necessary information has been provided. The deployment script generation module, such as deployment script generation module 408 of FIG. 4, within the solution engine then associates a user identifier with each of the users identified in the software legend (step 504).

Then the deployment script generation module creates a logic script based on the operating system and software needs as identified within the software legend (step 506), with the operation terminating thereafter. While one illustrative embodiment may create one logic script per user, an alternative embodiment may generate only one logic script that contains all the user identifiers within the one logic script. Upon activation, the logic script will perform a detection to match the user's personal computer identifier with the appropriate user identifier. At this point the solution engine is ready to configure a personal computer identified in the software legend with the appropriate software at the time a personal computer configuration is requested.

Figure 6:
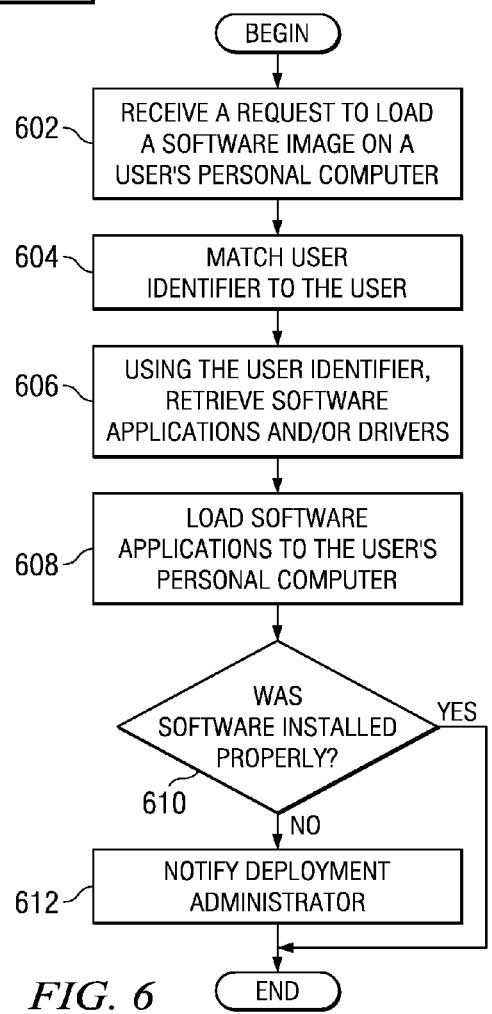
FIG. 6 depicts a flowchart of a personal computer configuration operation performed by a solution engine in accordance with an illustrative embodiment.

FIG. 6 depicts a flowchart of a personal computer configuration operation performed by a solution engine, such as solution engine 400 of FIG. 4, in accordance with an illustrative embodiment. As the operation begins, the solution engine receives a request to load a software image on a user's personal computer (step 602). The request is initiated by the personal computer after the operating system is loaded onto the personal computer and an external media containing an initiation script is connected to the personal computer. The logic script initiated by the initiation script matches a user identifier to the requesting user (step 604). The logic script initiated by the initiation script uses the user identifier to retrieve the software and/or driver configuration (step 606). The logic script initiated by the initiation script loads and configures the software on the user's personal computer (step 608). Using responses received from the user's personal computer during configuration, the solution engine determines if the software was installed properly (step 610). If the software was not installed properly, the solution engine notifies a deployment administrator (step 612), with the operation terminating thereafter. If at step 610, the software was installed properly, the operation terminates.

Thus, the illustrative embodiments provide a solution engine that receives a set of software applications and a software legend from a customer. The software legend identifies which software applications are to be deployed to each of a set of personal computers. The solution engine forms a set of software images or logic scripts by associating the software applications to each of the set of personal computers. The solution engine ensures that the logic script combines all the required software per user, so that the software required will be installed accordingly. In other words, a software image would be defined as an individualized set of software that is bound together by the solution engine. That is, the presently used software image is not restricted to traditional "software images" that are defined as proprietary files created by imaging software, such as Ghost™ or ImageUltra™ Builder).

Then, the solution engine associates an identifier to each of the set of software images to form individualized software images. The set of software images are deployed to the set of personal computers on an individual requirement basis. Thus, the illustrative embodiments transform a traditionally manual process into a decentralized and highly automated process that reduces duplication of work effort spent in identifying and allocating individual software packages to individual users. The illustrative embodiments reduce the time intensity and human error of manually loading software on new personal computers.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for individualized software deployment, the computer implemented method comprising:
   receiving a set of software applications;
   receiving a software legend, wherein the software legend identifies a number of the set of software applications to install on each of a set of personal computers;
   associating the number of the set of software applications to each of the set of personal computers to form a set of software images, wherein each of the individualized software images is operating system specific;
   associating an identifier to each of the set of software images to form individualized software images, wherein the set of software images are deployed to the set of personal computers on an individual requirement basis;
   receiving a request to load an individualized software image on one of the set of personal computers, wherein the request includes the identifier, wherein the request is received form the one personal computer via an initiation script initiated on the one personal computer;
   associating the identifier to a logic script; running the logic script to retrieve the software image identified in the logic script; and
   installing the software image on the one personal computer.

2. The computer implemented method of claim 1, wherein the set of personal computers are operating different operating systems.

3. The computer implemented method of claim 1, further comprising:
   associating a partition size to each of the set of personal computers to form the set of software images.

4. The computer implemented method of claim 1, further comprising:
   associating one or more drivers to each of the set of software images.

5. A data processing system comprising:
   a bus system;
   a communications system connected to the bus system;
   a memory connected to the bus system, wherein the memory includes a set of instructions; and
   a processing unit connected to the bus system, wherein the processing unit executes the set of instructions to receive a set of software applications; receive a software legend, wherein the software legend identifies a number of the set of software applications to install on each of a set of personal computers;
   associate the number of the set of software applications to each of the set of personal computers to form a set of software images, wherein each of the individualized software images is operating system specific;
   associate an identifier to each of the set of software images to form individualized software images, wherein the set of software images are deployed to the set of personal computers on an individual requirement basis;
   receive a request to load an individualized software image on one of the set of personal computers, wherein the request includes the identifier, wherein the request is received from the one personal computer via an initiation script initiated on the one personal computer;
   associate the identifier to a logic script;
   run the logic script to retrieve the software image identified in the logic script; and
   install the software image on the one personal computer.

6. The data processing system of claim 5, wherein the set of personal computers are operating different operating systems.

7. The data processing system of claim 5, wherein the processing unit executes the set of instructions to associate a partition size to each of the set of personal computers to form the set of software images.

8. The data processing system of claim 5, wherein the processing unit executes the set of instructions to associate one or more drivers to each of the set of software images.

9. A computer program product comprising:
   a computer usable storage medium storing computer usable program code for individualized software deployment, the computer program product including:
   computer usable program code for receiving a set of software applications;
   computer usable program code for receiving a software legend, wherein the software legend identifies a number of the set of software applications to install on each of a set of personal computers;
   computer usable program code for associating the number of the set of software applications to each of the set of personal computers to form a set of software images, wherein each of the individualized software images is operating system specific;
   computer usable program code for associating an identifier to each of the set of software images to form individualized software images, wherein the set of software images are deployed to the set of personal computers on an individual requirement basis;
   computer usable program code for receiving a request to load an individualized software image on one of the set of personal computers, wherein the request includes the identifier; wherein the request is received from the one personal computer via an initiation script initiated on the one personal computer;
   computer usable program code for associating the identifier to a logic script;
   computer usable program code for running the logic script to retrieve the software image identified in the logic script; and
   computer usable program code for installing the software image on the one personal computer.

10. The computer program product of claim 9, wherein the set of personal computers are operating different operating systems.

11. The computer program product of claim 9, further including:
    computer usable program code for associating a partition size to each of the set of personal computers to form the set of software images.

12. The computer program product of claim 9, further including:
    computer usable program code for associating one or more drivers to each of the set of software images.

* * * * *